(12) United States Patent
Amadio

(10) Patent No.: US 6,561,202 B1
(45) Date of Patent: May 13, 2003

(54) EXTENDIBLE SIDE GUIDE POLES FOR CAR WASH

(76) Inventor: Steven Amadio, 929 Central Ave., Ocean City, NJ (US) 08226

( * ) Notice: Subject to any disclaimer, the term of this patent is extended or adjusted under 35 U.S.C. 154(b) by 227 days.

(21) Appl. No.: 09/710,570

(22) Filed: Nov. 9, 2000

(51) Int. Cl.$^7$ ................................................. B08B 3/02
(52) U.S. Cl. ..................................... 134/123; 134/201
(58) Field of Search .......................... 134/45, 123, 201; 15/DIG. 2

(56) References Cited

U.S. PATENT DOCUMENTS

| | | | |
|---|---|---|---|
| 2,987,067 A | * | 6/1961 | Vani et al. |
| 3,089,168 A | * | 5/1963 | Blanford |
| 3,121,416 A | | 2/1964 | Gizdich |
| 3,259,138 A | | 7/1966 | Heinicke |
| 3,349,783 A | * | 10/1967 | Ellis |
| 3,421,526 A | | 1/1969 | Alkire et al. |
| 3,510,352 A | | 5/1970 | Neuman |
| 3,557,808 A | | 1/1971 | Gusse |
| 3,587,807 A | | 6/1971 | Hickman |
| 3,596,241 A | * | 7/1971 | Migneault |
| 3,658,590 A | * | 4/1972 | Huebner et al. |
| 3,826,269 A | | 7/1974 | Garrison |
| 4,036,165 A | | 7/1977 | Wood |
| 4,450,600 A | * | 5/1984 | Shelstad |
| 4,798,217 A | | 1/1989 | Hanna |
| 4,946,513 A | * | 8/1990 | Del Prato et al. |
| 4,979,536 A | * | 12/1990 | Midkiff |
| 5,231,392 A | | 7/1993 | Gust |
| 5,291,906 A | * | 3/1994 | White |
| 5,363,868 A | * | 11/1994 | Whatley, Sr. |
| 5,901,398 A | * | 5/1999 | Ishikawa et al. |
| 6,147,625 A | * | 11/2000 | Decker |

FOREIGN PATENT DOCUMENTS

| | | | |
|---|---|---|---|
| FR | 2302890 | * | 10/1976 |
| IT | 697328 | * | 10/1965 |
| JP | 58-128945 | * | 8/1983 |
| JP | 60-128047 | * | 7/1985 |

* cited by examiner

Primary Examiner—Frankie L. Stinson
(74) Attorney, Agent, or Firm—Norman E. Lehrer

(57) ABSTRACT

An improved automated car wash of the type wherein a vehicle remains stationary within an enclosure when being washed and the car wash includes washing equipment that moves relative to the vehicle. An elongated rail mounted on the floor defines a path for a vehicle entering the car wash to follow. The driver of the vehicle to be washed is instructed by a signaling system that advises him or her when to drive into the car wash, when to stop and when to exit. The improvement of the invention includes a plurality of extendible elongated guide poles mounted near the floor and adjacent the rails on either side of the vehicle. When the signaling system instructs the driver to enter the car wash, the poles are automatically pivoted upwardly so as to be visible to the driver for assisting the driver in guiding the vehicle into the car wash. When the vehicle is in place in the car wash and the signaling system instructs the driver to stop, the poles are automatically pivoted downwardly into an inoperative position so as not to interfere with the operation of the moving car washing equipment.

10 Claims, 3 Drawing Sheets

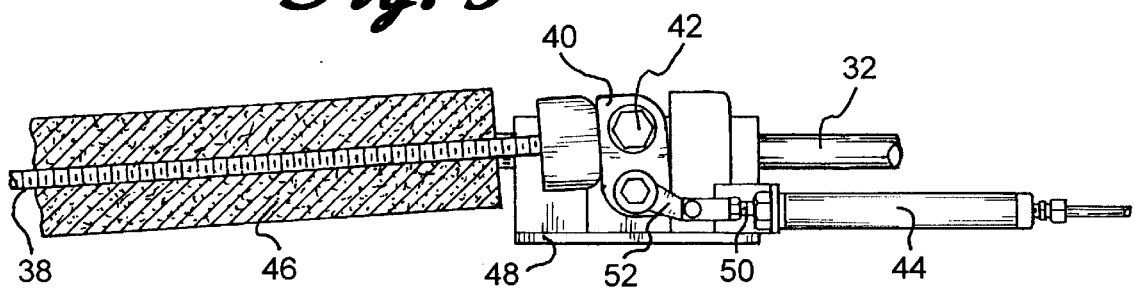
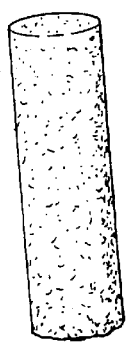
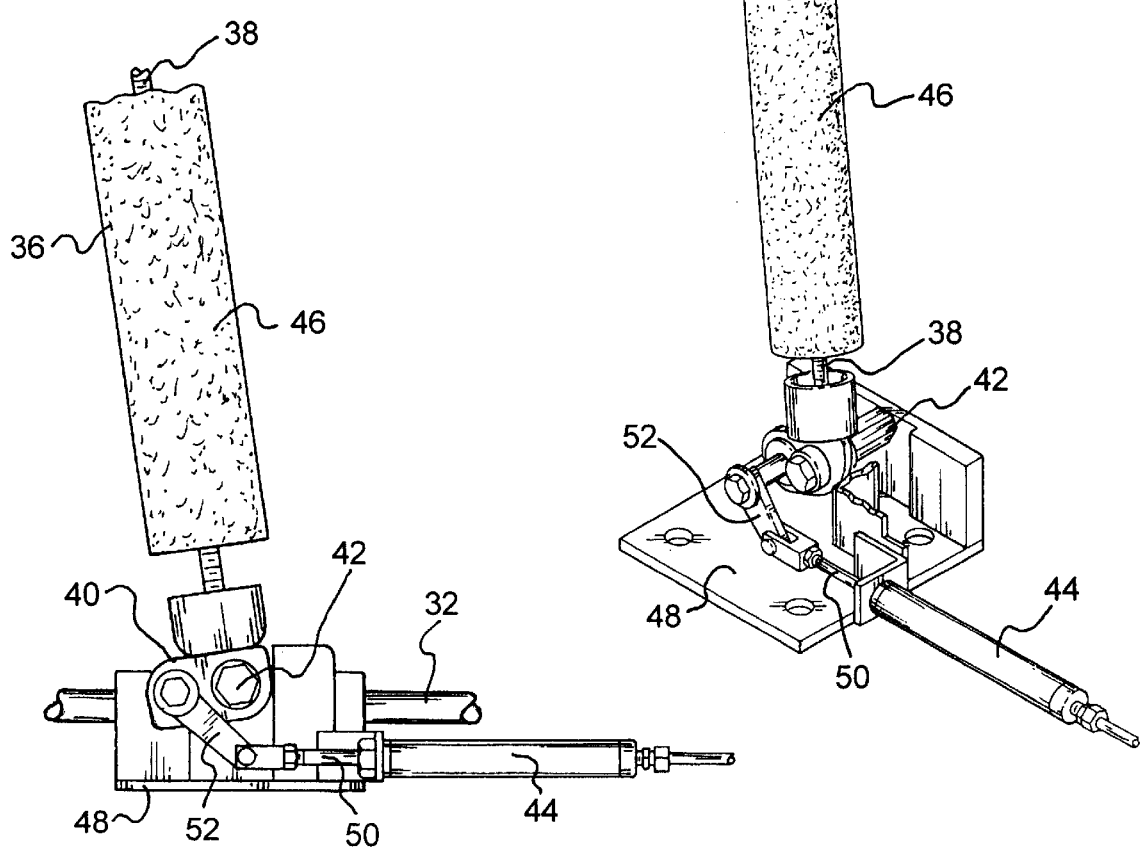

EXTENDIBLE SIDE GUIDE POLES FOR CAR WASH

BACKGROUND OF THE INVENTION

The present invention is directed toward guide poles for use with a car wash and, more particularly, toward extendible side guide poles that can automatically be moved into or out of position as needed.

There are currently two principal types of automatic car washing systems in use today. The first involves a series of pieces of equipment arranged along a path and a drive chain, conveyor or the like that pulls or pushes the automobile or other vehicle along the path so as to be acted upon by the various pieces of equipment. The equipment, such as cleaning brushes, liquid applicators, dryers and other cleaning devices, may reciprocate toward and away from the vehicle and into and out of the path of the vehicle but normally are fixed in that they do not travel along with the vehicle. Rather, the vehicle moves past the various pieces of car washing equipment.

The conveyor type of automatic car wash is normally operated by one or more attendants who oversee the movement of the cars into and out of the car wash and through the same. These attendants assist the driver of the vehicle in approaching the entrance of the car wash and properly aligning his or her vehicle so that the same is properly arranged with respect to the conveyor that will convey the vehicle through the car wash.

The second type of automated car wash currently in wide use does not employ a conveyor system. Rather, a driver drives his or her vehicle into a small building or enclosure and the car wash equipment including brushes, liquid applicators, dryers and the like move around the stationary vehicle.

These second types of automated car washes have gained popularity since they require substantially less space than conveyor type systems and normally do not require an attendant. In most cases, a driver approaching the car wash drops coins or a token into a coin box in order to activate the same. Frequently, a green light will then go on instructing the driver to drive into the enclosure. When the car is in its proper position, a red light will tell the driver to stop. At that point, the automated equipment passes around the vehicle washing the same. When the vehicle has been washed, the red light is extinguished and the green light is again lit advising the driver to exit the other end of the building or enclosure.

In order to ensure that the vehicle is properly aligned relative to the car washing equipment within the enclosure, these automated car washes normally include an elongated rail mounted on the floor. However, because there usually are no attendants at the car wash, there is no one to help guide the driver into proper alignment with respect to the rails so that he or she can properly enter the car wash enclosure. As a result, the driver may drive over the rail or drive too far away therefrom. This can cause damage to the vehicle, the guide rails and/or to other parts of the car wash including the car wash equipment.

While it might be possible to erect permanent guides to help guide the driver into the car wash, these permanent guides would then interfere with the moving car wash equipment. This would occur because the guides, in order to be of any use to the driver, must be arranged in the vicinity of the rail and must be at a sufficient vertical level so as to be visible to the driver. Permanent guides are, therefore, not acceptable. There is, however, a need in the art for a way of guiding a driver into an automated car wash.

SUMMARY OF THE INVENTION

The present invention is designed to overcome the deficiencies of the prior art discussed above. It is an object of the present invention to provide extendible side guide poles for a car wash that can automatically be moved into or out of position as needed to help guide a vehicle into the car wash.

It is another object of the invention to provide extendible side guide poles for a car wash that will not interfere with the operation of the car wash.

It is a still further object of the invention to provide extendible side guide poles for a car wash that can automatically be moved into or out of position as needed to help guide a vehicle into the car wash and which can easily be installed in an existing car wash with little modification thereto.

In accordance with the illustrative embodiments demonstrating features and advantages of the present invention, there is provided an improved automated car wash of the type wherein a vehicle remains stationary within an enclosure when being washed and the car wash includes washing equipment that moves relative to the vehicle. An elongated rail mounted on the floor defines a path for a vehicle entering the car wash to follow. The driver of the vehicle to be washed is instructed by a signaling system that advises him or her when to drive into the car wash, when to stop and when to exit. The improvement of the invention includes a plurality of extendible elongated guide poles mounted near the floor and adjacent the rails on either side of the vehicle. When the signaling system instructs the driver to enter the car wash, the poles are automatically pivoted upwardly so as to be visible to the driver for assisting the driver in guiding the vehicle into the car wash. When the vehicle is in place in the car wash and the signaling system instructs the driver to stop, the poles are automatically pivoted downwardly into an inoperative position so as not to interfere with the operation of the moving car washing equipment.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 3 is a perspective close-up view of one of the guide poles of the invention and its hydraulic actuator;

FIG. 4 is a side elevational of FIG. 3 taken through the line 4—4 of FIG. 1 and showing the details of the guide poles and hydraulic actuator, and FIG. 5 is a side elevational similar to FIG. 4 showing the guide pole in its lowered position and taken through the line 5—5 of FIG. 2.

DETAILED DESCRIPTION OF THE PREFERRED EMBODIMENT

Figure 1:
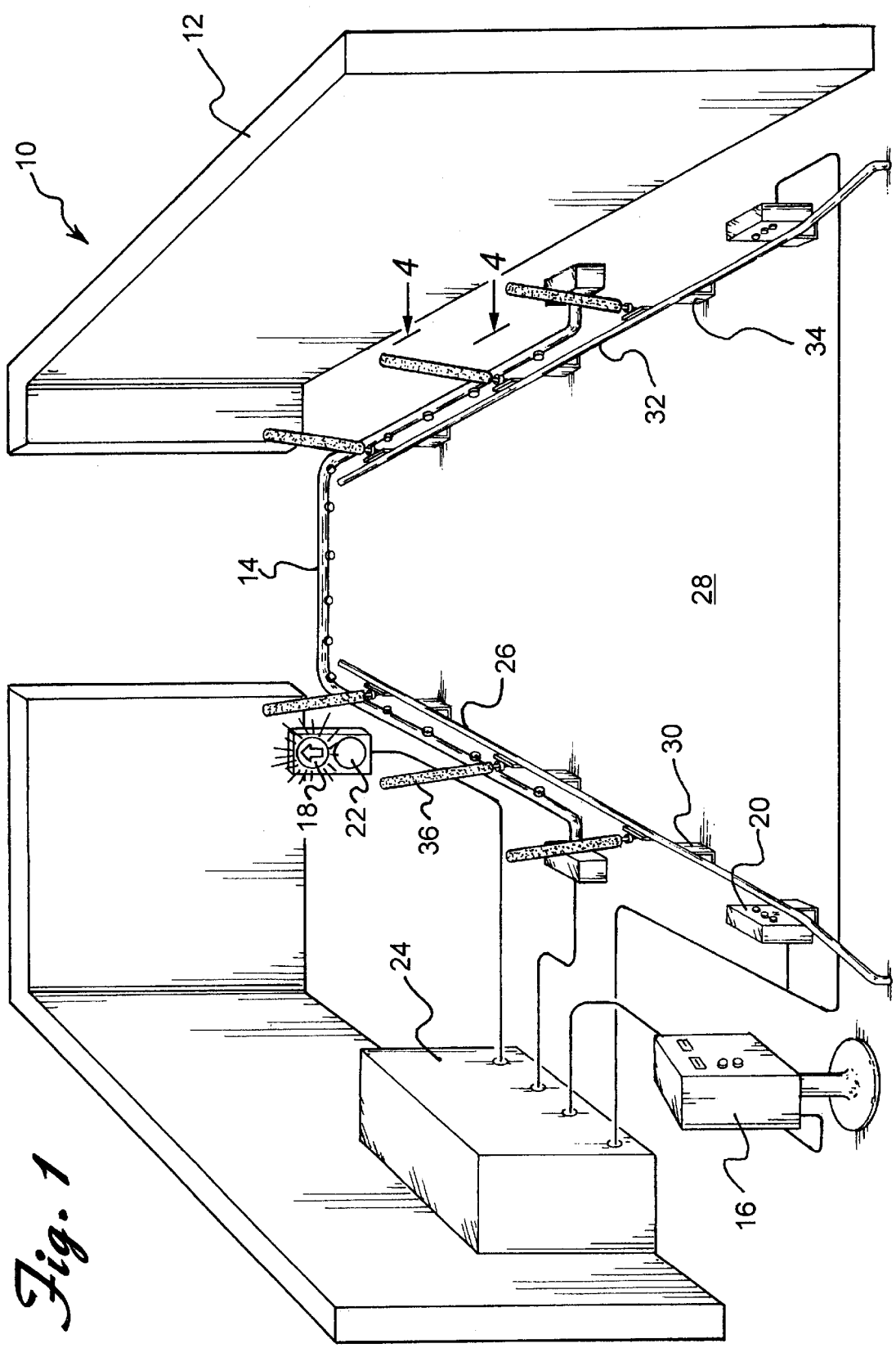
FIG. 1 is a front perspective schematic view of a car wash prior to a vehicle entering the same and showing the plurality of guide poles in their raised operative position.
Figure 2:
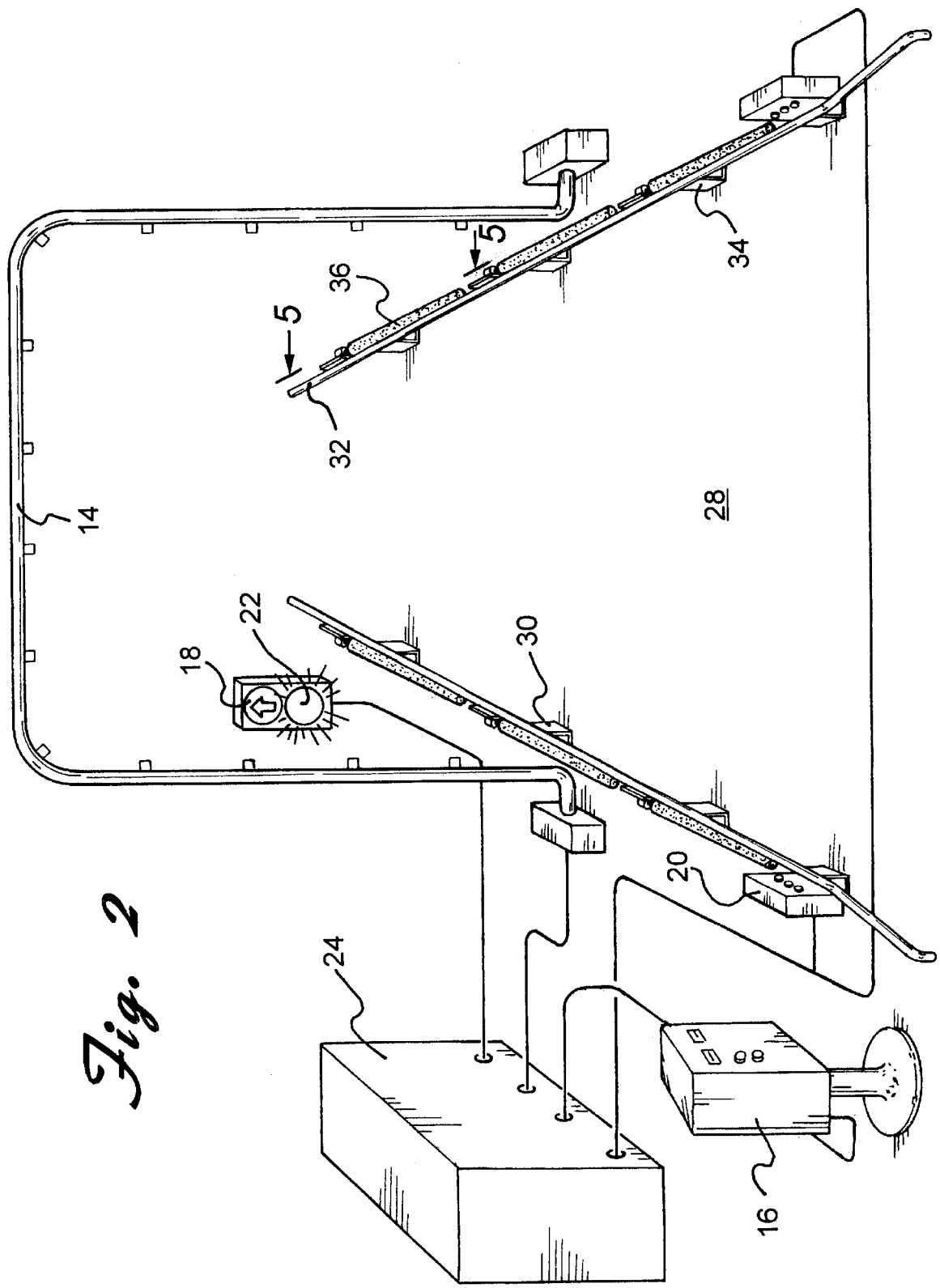
FIG. 2 is a view similar to FIG. 1 but showing the guide poles in their lowered inoperative position.

Referring now to the drawings in detail wherein like reference numerals have been used throughout the various figures to designate like elements, there is shown in FIGS. 1 and 2 an overview of an automatic car wash with extendible guide poles constructed in accordance with the principles of the present invention and designated generally as 10. The car wash 10 is of the second type described above wherein the vehicle (not shown) enters a small building or enclosure 12 and remains stationary while the car wash equipment such as the sprayer 14 moves relative to the car or the vehicle for washing the same. As should be readily apparent to those skilled in the art, the sprayer 14 is shown diagramatically and by way of example only.

Frequently, much more sophisticated pieces of washing equipment such as rotating brushes and the like are utilized which may be mounted on an overhead track for movement around the vehicle and which contact the vehicle in order to wash the same. Irrespective of the type of car washing equipment utilized, the vehicle remains stationary within the enclosure while the equipment moves relative to the car of other vehicle.

The majority of these types of car washes 10 include a coin box 16 or the like located adjacent the forward end thereof which accepts coins or tokens in order to activate the car wash. As the driver approaches the car wash 10, he or she deposits the required coins or tokens into the box 16, a signaling system in the form of a green light 18 will illuminate thereby instructing the driver to enter the car wash. When the car is in its proper position within the car wash 10 as sensed by the photocells 20 or the like, a red light 22 on the signaling system will be illuminated thereby instructing the driver to stop his or her vehicle. At this point, the car washing equipment 14 will go into operation. All of the foregoing is controlled by an automatic controller 24 which is, per se, well known in the art.

A left side elongated rail 26 is mounted on the floor 28 of the car wash 10 through the use of a plurality of L-brackets 30. A similar right side elongated rail 32 is mounted to the floor 28 through the use of L-brackets 34. The rails 26 and 32 define a path for a vehicle entering the car wash to follow and, when the vehicle is within the space defined by the rails 26 and 32, it is in the proper position so as to be washed by the car washing equipment 14.

All of the foregoing forms part of the prior art and is well known to those skilled in the art. One such system is shown and described, for example, in U.S. Pat. No. 3,587,807 to Hickman, the entire disclosure of which is incorporated herein by reference.

Although the elongated rails 26 and 32 are intended to help guide a vehicle into proper alignment within the car wash 10, these rails are difficult, if not impossible, for a driver to see as he or she is approaching the entrance. The present invention provides a means for assisting the driver to ensure that the vehicle properly enters the car wash 10.

Located on either side of the car wash 10 and closely adjacent the rails 26 and 32 are a plurality of extendable elongated guide poles such as shown at 36. While six such guide poles 36 are shown in the preferred embodiment of the invention, it should be readily apparent that this is by way of example only. It is possible to practice the present invention with more than or fewer than six guide poles. Furthermore, while the guide poles are shown adjacent both of the rails 26 and 32, it may be possible to align the guide poles along only one of the two rails although it is preferred to provide guide means on both sides of the vehicle.

The guide poles 36 are mounted near the floor 28 of the car wash 10 and are pivotal between their upright operative positions as shown in FIG. 1 wherein each of the guide poles 36 is visible to the driver of the vehicle and an inoperative downward position as shown in FIG. 2 so as not to interfere with the operation of the moving car washing equipment 14 or similar moving equipment.

The details of each of the guide poles 36 are shown in FIGS. 3, 4 and 5. As should be readily apparent, while only one guide pole is shown in these figures and is being described herein, each of the other guide poles is constructed in essentially the same manner and functions in the same way.

The guide pole 36 is comprised essentially of an elongated relatively rigid rod 38 securely fixed at its bottom to a plate 40. The plate 40 is mounted for rotation about a horizontal axis 42. The length of the rod 38 may be from about 30 to 48 inches long although this is by way of example only; the primary requirement being that it be long enough so as to be visible to a driver entering a car wash when the guide poles 36 are in their operative elevated position as shown in FIG. 1. Surrounding the rods 38 are tubes 46 of foam or similar material. These may be of a bright color so as to be more easily visible and the foam provides protection from scratching or otherwise marring the finish of a vehicle should the vehicle contact the same.

The guide pole 36 is moved by the use of an hydraulic cylinder 44 mounted to support plate 48. The cylinder 44 includes a reciprocating piston 50 pivoted to a link 52 which, in turn, is pivoted to the plate 48.

As should readily be apparent to those skilled in the art, when the hydraulic cylinder 44 is activated, piston 50 extends outwardly (to the left as shown in FIGS. 3, 4 and 5) thereby causing the guide pole 36 to pivot or rotate clockwise from the downward position as shown in FIG. 5 to its upward position as shown in FIGS. 3 and 4. Preferably, the upward position is not perfectly vertical but is inclined slightly away from the vertical as shown in FIGS. 3 and 4. As a result, when it is desired to lower the guide poles 36, all that is necessary is to deactivate the hydraulic cylinders 44 and the guide poles 36 will pivot downwardly through the force of gravity. Alternatively, it is possible to include a spring within the hydraulic cylinders 44 in order to assist the guide poles 36 in pivoting downwardly.

Although the preferred form of the invention utilizes hydraulic cylinders 44 and various linkages etc. to pivot the guide poles 36, it should be readily apparent this is by way of example only and that other motor means such as solenoids, rotary or stepping motors or similar devices could also be utilized. Furthermore, in lieu of pivoting the guide poles 36, it is not beyond the scope of the present invention to utilize telescoping poles or similar devices; the only requirement being that the guide poles must be able to be moved from a downward inoperative position to an upper operative position wherein they will be visible to the driver. In any event, movement of the guide poles 36 is controlled by the controller 24.

The present invention is utilized in the following manner. As a vehicle approaches the car wash 10, the guide poles 36 may be in their downward, inoperative position as shown in FIG. 2. When the driver inserts coins or a token into the coin box 16, the controller 24 will activate each of the guide poles 36 raising them into their upper position as shown in FIG. 1. At the same time, the green light 18 will signal the driver to enter the car wash. When the vehicle reaches its proper position as sensed by the sensors 20, the green light 18 will extinguish and red light 22 will illuminate instructing the driver to stop. At the same time, the guide poles 36 will pivot downwardly into their inoperative position as shown in FIG.

2. The car is then washed by the washing equipment 14. After the washing is completed, the controller 24 will cause the green light 18 to again illuminate as the guide poles 36 are again pivoted upwardly into their operative position. The vehicle then exits the building or enclosure 12 and the cycle is ready to begin again.

The present invention may be embodied in other specific forms without departing from the spirit or essential attributes thereof and accordingly, reference should be made to the appended claims rather than to the foregoing specification as indicating the scope of the invention.

I claim:

1. In an automated car wash of the type wherein a vehicle remains stationary within an enclosure when being washed and the car wash includes washing equipment that moves relative to the vehicle; said car wash including a floor and an elongated rail mounted on said floor; said rail defining a path for a vehicle entering the car wash to follow; said car wash further including a signaling system for advising the driver of a vehicle when to drive into said enclosure, when to stop and when to exit said enclosure; the improvement comprising guide means located adjacent said rail and extending upwardly so as to be visible to the driver of said vehicle for assisting the driver in guiding the vehicle into said enclosure and further including moving means for moving said guide means between an inoperative lowered position and a raised operative position wherein it extends upwardly and is visible to the driver.

2. The improvement as claimed in claim 1 wherein said guide means automatically moves to said operative position when said signaling system advises the driver to drive into said enclosure and automatically moves into said inoperative position when said signaling system advises the driver to stop.

3. The improvement as claimed in claim 1 wherein said guide means is comprised of an elongated pole and wherein said moving means pivots said pole between a substantially horizontal lowered position and a substantially vertical upward position.

4. The improvement as claimed in claim 3 wherein said guide means is comprised of a plurality of elongated poles arranged in a row along at least one side of said car wash and wherein said moving means pivots each of said poles between a substantially horizontal lowered position and a substantially vertical upward position.

5. The improvement as claimed in claim 4 wherein said guide means is comprised of a plurality of elongated poles arranged in two rows along each side of said car wash.

6. The improvement as claimed in claim 5 wherein each of said poles is covered with a foam material.

7. The improvement as claimed in claim 5 wherein all of said poles are moved in unison.

8. The improvement as claimed in claim 3 wherein said pole is covered with a foam material.

9. The improvement as claimed in claim 1 wherein said moving means is comprised of an hydraulic cylinder.

10. The improvement as claimed in claim 9 wherein said hydraulic cylinder raises said guide means into said operative position and wherein said guide means moves into its inoperative position by gravity.

\* \* \* \* \*